United States Patent [19]

Keith

[11] 4,171,287

[45] Oct. 16, 1979

[54] CATALYST COMPOSITIONS AND THE METHOD OF MANUFACTURING THEM

[75] Inventor: Carl D. Keith, Summit, N.J.

[73] Assignee: Engelhard Minerals & Chemicals Corporation, Iselin, N.J.

[21] Appl. No.: 836,108

[22] Filed: Sep. 23, 1977

[51] Int. Cl.$^2$ .................... B01J 23/10; B01J 23/64; B01J 23/74; B01J 21/04
[52] U.S. Cl. .................. 252/462; 252/466 B; 252/466 PT; 423/213.5
[58] Field of Search ............. 252/462, 466 PT, 466 B; 423/213.5

[56] References Cited

U.S. PATENT DOCUMENTS

| | | | |
|---|---|---|---|
| 3,840,471 | 10/1974 | Acres | 252/466 B |
| 3,939,104 | 2/1976 | Campbell et al. | 252/455 R |
| 3,993,572 | 11/1976 | Hindin et al. | 252/462 |
| 4,006,103 | 2/1977 | Meguerian et al. | 252/466 B |

Primary Examiner—W. J. Shine

[57] ABSTRACT

Catalysts are disclosed which have good activity and life when used to promote the conversion of hydrocarbons, carbon monoxide and nitrogen oxides contained in small concentrations in gaseous streams, to obtain the less noxious materials, carbon dioxide, water and nitrogen. The catalysts contain a catalytically-promoting, platinum group metal component, a catalytically-promoting, base metal component added as a solid material, and an alumina support component, deposited on a macrosize carrier. The base metal component contains a metal selected from the group consisting of metals having an atomic number from 25 to 28 and rhenium. The base metal and alumina components are preferably composited before deposition on the macrosize carrier, and the composite may also contain the platinum group metal component before such deposition. The catalytically-promoting metal components and alumina support can be comminuted as a slurry, and the liquid medium of the slurry is preferably acidic. The macrosize carrier, bearing the catalytic components may be dried and, if desired, calcined. The catalysts contain platinum or palladium, especially platinum, and preferably, one or more of rhodium, ruthenium and iridium, especially rhodium, in order to promote adequately the simultaneous conversion of hydrocarbons, carbon monoxide and nitrogen oxides to less noxious materials.

40 Claims, No Drawings

CATALYST COMPOSITIONS AND THE METHOD OF MANUFACTURING THEM

The present invention relates to catalytic structures which contain catalytically-promoting, platinum group metal and base metal components, and an alumina support component, deposited on a macrosize carrier. The catalysts exhibit good activity and life when used to promote the conversion of hydrocarbons, carbon monoxide and nitrogen oxides even when contained in minor concentrations in gaseous streams. Preferably, the catalysts are formulated in order that they are capable of promoting these conversions simultaneously, at least under controlled reaction conditions. The products of the reactions are primarily carbon dioxide, water and nitrogen which are relatively innocuous when discharged into the atmosphere. The catalytic structures contain platinum or palladium, especially platinum, preferably along with one or more of rhodium, ruthenium and iridium, especially rhodium, as a platinum group metal component; one or more base metals selected from the group consisting of metals having an atomic number from 25 to 28 and rhenium, e.g., nickel oxide, and an alumina support component, deposited on a carrier. The base metal component is added as a solid material to the support, and preferably these components are mixed before being deposited on the carrier. This mixture may also contain the platinum group metal component of the catalyst. The carrier may have a lower total or specific surface area than the alumina support and preferably the carrier is in monolithic form.

The catalytic treatment of various gaseous streams containing minor amounts of materials which are considered to be atmospheric pollutants such as hydrocarbons, carbon monoxide and nitrogen oxides has been practiced on a commercial basis for a number of years. It is desired to convert these pollutants to the less noxious materials, carbon dioxide, water and nitrogen. Generally, the gaseous streams which are treated are effluent or waste gas streams which are discharged into the atmosphere in large quantities, and a salient example of such treatments is the high temperaure contact of the exhaust gases of internal combustion engines with a catalyst containing a platinum group metal component. Initially, most attention was directed on a commercial basis to the oxidation of the hydrocarbon and carbon monoxide components of the gaseous streams, and generally the treating system contained an excess of oxygen based on complete combustion of these components to carbon dioxide and water. Since the catalysts employed also had a capability of promoting reduction reactions, there may have occurred during the treatment some reduction of nitrogen oxides into nitrogen and/or ammonia, although the presence of the latter material in the products is undesirable.

A number of exhaust gas-treating systems containing a plurality of catalysts have been proposed, and the operations often involve the use of one catalyst under reducing conditions to maximize the conversion of nitrogen oxides to nitrogen, and a separate catalyst is employed under oxidizing conditions to maximize the conversion of carbon monoxide and hydrocarbons to carbon dioxide and water. Such systems are expensive and, therefore, undesirable, particularly where the amount of space available for containing the catalytic equipment is limited as is usually the case with automotive vehicles. However, as time passes the levels of pollutants that may be charged acceptably into the atmosphere are being lowered to the extent that both the oxidation of carbon monoxide and hydrocarbons and the reduction of nitrogen oxides must be accomplished to a high degree if government regulations are to be satisfied. It is, therefore, quite important to develop catalytic systems for treating such gases most effectively and under economically attractive conditions.

The physical and chemical relationships which exist in catalysts can be defined to a considerable extent, yet the performance characteristics of catalysts frequently depend on the manner in which a catalyst is made even though a significant or controlling physical or chemical distinction of the resulting catalyst cannot readily be established. This is especially the case when the catalysts contain a plurality of catalytically-promoting metal components admixed with one or more support components which are apparently associated in ways which are undefined to a significant extent. Such catalysts may be used to promote several reactions simultaneously, and the desirable catalyst characteristics must be maintained when the catalysts are attempted to be made by different procedures.

The art has become aware that the foregoing described oxidation and reduction reactions can be conducted simultaneously by using a single catalyst system to treat the contaminated gases while maintaining the fuel to molecular oxygen ratio in the gaseous stream at, or close to, the stoichiometric amount needed to convert the hydrocarbon and carbon monoxide components to carbon dioxide and water, while taking into account the amount of oxygen made available by the reduction of nitrogen oxides to nitrogen. Especially when treating gases whose composition varies frequently as is the case with automotive vehicle exhaust gases, the system needed to maintain the gas-treating conditions at near stoichiometric is more expensive than less controlled operations. This makes it even more important that the cost of the catalytic equipment be low. Thus, catalysts which can operate at high temperatures over long periods of time while maintaining good activity for promoting the desired oxidation and reduction reactions simultaneously are of great interest and are, or will shortly become, in great demand, particularly such catalysts that maintain a high degree of both oxidation and reduction activity under the strenuous and erratic conditions to which catalysts are subjected while treating internal combustion engine exhaust gases.

Relatively stable catalysts with such exceptional performance characteristics may have a plurality of active, reaction-promoting metal components which are well dispersed in a catalytically-active support. The manufacture of such catalysts is, however, relatively expensive for a variety of reasons. The catalytically-promoting metal components are generally incorporated in the catalysts as water-soluble materials which are a relatively expensive source of supply. It has been a practice to impregnate the support with a plurality of solutions containing separate ones of the catalytically-active, promoting metal components, and a plurality of steps such as multiple impregnation, drying, calcination or chemical treatments may be used. In making such catalysts differences in absorption characteristics between two or more water-soluble, metal components may result in non-uniform catalyst surfaces from a compositional, as well as, a catalytic activity standpoint. Further deposition of a soluble base metal component on the support may result in unwanted reaction of such material with the support at high temperatures to yield relatively inactive spinel compositions.

There have been developed catalysts which contain both a platinum group metal component and a base metal, e.g., nickel, component as catalytically-promoting metal components, and a support which may also exhibit a modicum of catalytic activity or at least have a relatively high surface area. These catalysts have been made by combining aqueous solutions of the metal components with the support in solid form. The solutions represent the promoting metals in a highly dispersed state, and it is generally considered that such procedures are advisable, if not necessary, to provide an intimate relationship among the platinum group metal component which is present in small amounts, the base metal component and the support. Thus even though the use of aqueous solutions of water-soluble forms of the catalytically-promoting metal components gives rise to the most expensive catalysts, the solutions have been employed in order to prepare the most effective catalysts.

In the present invention it has been found that catalysts of excellent activity and stability, both chemical and physical, can be made by combining a platinum group metal component and a solid, base metal component with an alumina support component, and at least ultimately depositing these materials on a macrosize carrier. The base metal component contains one or more metals selected from the group consisting of metals having an atomic number from 25 to 28 and rhenium. Throughout the preparation of the catalysts the major portion of the base metal remains in solid form. As a result, the base metal may be dispersed in the catalysts in a larger particle size than in previous catalysts of this general type. However, the catalysts of this invention exhibit properties which compare quite favorably with prior catalysts, and the catalysts of this invention may even be superior at least in some respects. The outstanding results provided by the present invention are manifested in catalysts that are designed for use in quite complex reactions. Thus, the present invention is applicable to catalysts which contain a plurality of platinum group metal components including platinum or palladium, especially platinum, and one or more of rhodium, ruthenium and iridium, especially rhodium, as well as the base metal component, and an alumina support component, e.g., high surface area alumina, which components are deposited on a macrosize substrate, particularly of monolithic structure. Such catalysts can be formulated to be capable of promoting the simultaneous and substantially complete conversion of hydrocarbons, carbon monoxide and nitrogen oxides present in gaseous streams to less noxious materials as described above, but without producing significant amounts, if any, of hydrogen sulfide, sulfur trioxide or sulfuric acid in the products issuing from the reaction system.

In accordance with the present invention there is provided a method of manufacturing a catalyst composition which method includes the steps of providing the platinum group metal component by contacting the support with a liquid containing a compound of a platinum group metal, maintaining at least a major amount of the base metal component in solid form throughout the manufacture of the catalyst composition, depositing the solid base metal component and the solid support on the carrier by contacting the carrier with a slurry or slurries of these solids, and drying the support after contacting it with the liquid containing the compound of a platinum group metal, to provide the platinum group metal component.

In accordance with one aspect of the invention, a catalyst made as above-described is provided.

In accordance with the present invention, catalysts are preferably made by intimately admixing a solid, base metal component with a solid alumina support component before either of these components is deposited on the macrosize carrier. A platinum group metal component may be added to the macrosize carrier having deposited thereon the base metal and alumina components, but it is preferred that the latter components be combined with one or more platinum group metal components before they are placed on the macrosize carrier. When this procedure is used, it is preferred that the platinum group metal component be added to an alumina support before the support is combined with the base metal component.

In accordance with this invention the compositing of the catalytically-promoting, platinum group metal component and the alumina support and/or the solid, base metal component can be accomplished by intimately admixing a liquid containing a soluble or dispersed form of the catalytically-promoting, platinum group metal with the solids. Preferably, essentially all of such solution or dispersion is absorbed by the solids. The solution or dispersion is generally aqueous in nature. If in dispersion form, the particle sizes of the platinum group metal component are preferably colloidal, although in the preparative system of this invention particles of somewhat larger size may be adequately dispersed. The solution may contain one or more water-soluble, platinum group metal compounds, e.g., a basic compound such as a platinum hydroxide tetramine complex, or an acidic compound such as chloroplatinic acid, palladium chloride, ruthenium chloride, iridium chloride or rhodium nitrate. The dispersion may contain particles having, at least for the most part, sizes below about one micron such as a platinum sulfide sol. Highly suitable composites can be made by combining the solids with both a basic platinum compound and an acidic compound of another platinum group metal such as rhodium or ruthenium. Separate compounds of the catalytically-promoting platinum group metals may be added to the support in one or more aqueous solutions or dispersions to provide two or more platinum group metals on given support particles.

Although the platinum group metal component may be combined with the alumina support after the latter is deposited on the macrosize carrier, it is preferred that these materials be mixed before the support is on the carrier. In the latter case, the platinum group metal component may be combined with an alumina support after the latter is combined with the solid, base metal component, or the alumina support and solid, base metal component may be combined after the platinum group metal component and either the solid, base metal component or the alumina support are composited. Alternatively, the platinum group metal component and the solid, base metal component may be mixed with separate portions of other materials, e.g., the alumina or other support, and the resulting materials combined. Where there are separate additions of platinum group or other metal components to the composition, the separate additions may be accomplished at the same stage, or in different stages, of the preparative procedure.

In the catalysts of this invention, the platinum group metal component is present in a minor, catalytically-effective amount sufficient to provide compositions having significantly enhanced catalytic activity, and at least platinum or palladium, especially platinum, is present. The useful platinum group metals include, for instance, platinum, ruthenium, palladium, iridium and rhodium, and mixtures or alloys of such metals, e.g., platinum-ruthenium, platinum-rhodium, palladium-rhodium, platinum-rhodium-iridium or platinum-palladium-rhodium. The amount of platinum group metal is a minor portion of the catalyst, and generally does not materially exceed about 5 weight percent. For instance, the amount may be about 0.01 to 4%, and is preferably about 0.02 to 1%. It is preferred that the platinum group metal component of the catalysts contains more than one of such metals, and be composed of a major amount of one or both of platinum and palladium, especially platinum, and a minor amount of one or more of the other platinum group metals, e.g., one or more of ruthenium, iridium and rhodium, especially rhodium. For example, this component of the catalyst may have about 55 to 98 weight % of total platinum and palladium, and about 2 to 45 weight % of total other platinum group metal, e.g., total ruthenium, iridium and rhodium, based on the total of all of these metals. Catalysts of the best activity and whose performance characteristics have less dependence on the presence of the base metal oxide component, contain a weight ratio of total platinum and palladium to total rhodium, ruthenium and iridium of about 2 to 5:1, and as this ratio increases the importance of the base metal oxide component increases. Due to the cost and limited availability of rhodium, ruthenium and iridium, the ratio used is often about 8 to 30:1. The ratio of platinum to rhodium in a preferred embodiment is approximately 95/5 Pt/Rh. Since this ratio is approximately that in which platinum and rhodium are found in South African ore, there are commercial advantages to using a 95/5 ratio. The ore or mine ratio of Pt/Rh/Ir is approximately 19/1/0.2 and this ratio of metals may be advantageously employed. It may be desireable to increase the amount of rhodium present by a factor of about two, e.g. use a ratio of about 20 Pt/2 Rh/0.3 Ir. The catalysts containing one or both of platinum or palladium, and one or more of rhodium, ruthenium and iridium, along with the base metal component, are particularly useful for promoting the simultaneous conversion of hydrocarbons, carbon monoxide and nitrogen oxides to less noxious materials. The foregoing amounts of the catalytically-promoting platinum group metals are stated on the basis of the metals regardless of the form in which they are present in the catalysts, and are based on the total, dry weight of the catalysts, including the macrosize carrier.

When the catalytically-promoting, platinum group metal component is in solution form and is combined with the alumina support, this catalytically-promoting metal component may be fixed on the support, i.e., converted to essentially water-insoluble form, and preferably this may be done while the composite is maintained essentially devoid of unabsorbed liquid medium. The conversion may be effected by treatment with a gas such as hydrogen sulfide or hydrogen, or with a liquid such as acetic acid or other agents which may be in liquid form, especially an aqueous solution, e.g., a hydrazine or other reducing solution. The amount of liquid used, however, is preferably not sufficient for the composite to contain any significant or substantial amount of unabsorbed liquid during the fixing of the catalytically-promoting, platinum group metal on the support. The fixing treatment may be with a reactive gas or one which is essentially inert, for example, the fixing may be accomplished by calcining the composite in air or other gas which may be reactive or essentially inert with the catalytically-promoting, platinum group metal component. The resulting insoluble or fixed, catalytically-promoting, platinum group metal component may be present as a sulfide, oxide, elemental metal, alloy or in other form. Rather than add the platinum group metal component as one or more solutions, a dispersion of a relatively insoluble form of the catalyst promoter may be used, e.g., an aqueous platinum sulfide sol. Preferably, the liquid of the dispersion is aqueous.

Generally, the alumina support, at some point after the step of contacting it with the liquid containing the platinum group metal compound, is heated, as shown in the examples, at a temperature sufficiently high to provide on the support the desired platinum group metal component.

The catalysts of the invention contain one or more base metal components selected from the group of metals having atomic numbers from 25 to 28 (manganese and the iron group metal, i.e., nickel, iron and cobalt) and rhenium. In making the catalysts, one or more of the catalytically-promoting, base metal components in solid form are combined with the alumina support. When combined, one or both of these components may be finely divided, and both are preferably in this form. The promoting metal component may be an oxide or an oxygen-containing compound which decomposes to an oxide at elevated temperatures and which does not unduly adversely affect the catalytic or other desirable properties of the materials present. Suitable decomposition temperatures include those which are encountered during drying, calcination or use of the catalyst. When combined with the other components of the catalyst, the solid, base metal component may be in elemental or alloy form, and may be used as such or converted, at least in part, to an oxide form during use or calcination or other treatment of the catalyst at elevated temperatures in the presence of an oxygen-containing gas. The solid, base metal component is in a form which is substantially insoluble in the liquids present during the manufacture of the catalyst, and the use of substantially water-insoluble forms of the metals is preferred. At least a major amount of the total metal having an atomic number of from 25 to 28 and rhenium provided in the catalyst does not become dissolved throughout the preparation of the catalyst, i.e., during or after being combined with the alumina support. These catalytically-promoting metal components mixed with the alumina support may be in oxide, hydroxide, acetate, formate, carbonate, tungstate, titanate, phosphate, silicate or other organic or inorganic form. Nickel is a preferred metal, and it may be present along with, for example, minor amounts of cobalt, manganese or other components. Mixtures of cobalt and manganese components may also be preferred base metal components. The catalysts of this invention may contain other materials such as other base metal components.

The total of the metals having atomic numbers from 25 to 28 and rhenium in the catalysts of this invention is generally a minor portion of the catalyst, and the amount is sufficient to provide a desired catalytically-promoting effect during the use of the catalyst. Such amounts may depend on the choice of metal and the intended use of the catalyst, and the amounts are generally at least about 0.1 or 0.5 weight % of the catalyst. These amounts may be up to about 10% or more, and preferably, the amounts are about 1 to 6%. The amounts of this catalytically-promoting metal component are stated on a metal basis regardless of the form in which the metal is present in the catalysts, and are based on the total, dry weight of the catalysts, including the macrosize carrier. Often the total amount of these base metals present in the catalyst is greater than the platinum group metal, for instance in a weight ratio of at least about 2:1, preferably at least about 5:1, say up to about 25:1 or more.

The alumina support component of the catalysts of this invention contains a major amount of one or more finely-divided, aluminum oxide forms as an essential component. It is preferred that the alumina be predominantly in activated or calcined form such as gamma, delta, or eta alumina, and the support may have a relatively high total or specific surface area, e.g., at least about 40 square meters per gram as determined by the BET procedure. The support may preferably be in such form when combined with the solid base metal component. More highly hydrated aluminas may also be employed as the support material, and may be converted to less hydrous, activated forms during calcination or use. The support component may contain a minor amount of one or more ingredients other than alumina, such as refractory oxides, e.g., silica or metal oxides such as chromia, zirconia, titania and the like. The alumina support may be in a mixed or combined oxide form such as silica-alumina, aluminosilicates which may be amorphous or crystalline, alumina-zirconia, alumina-chromia, alumina-ceria and the like. The refractory oxide may be dried or calcined at an elevated temperature to provide a high total surface area material, e.g., preferably having a surface area of at least about 75 square meters per gram. The preferred supports are comprised substantially of heat-stabilized alumina which may result from high temperature calcination, e.g., at about 750° to 1200° C., in the presence of a minor amount, e.g., about 1 to 20 weight percent of a stabilizing component such as $ZrO_2$, $TiO_2$, alkaline earth metal oxides, such as barium, calcium or strontium oxide, or rare earth oxides, e.g., ceria, and lanthanum oxide, and their mixtures. These stabilizing components may also serve to minimize reaction between the base metals and alumina and thus decrease or avoid the formation of less active spinels. Most desirably, the amount of alumina in the support component of the catalysts is at least about 75% of the total weight of this component. The alumina support is a substantial portion of the material placed on the macrosize carrier and often is a major weight amount of such material. The alumina support component may, for example, comprise about 0.1 to 30, preferably about 2 to 20, weight percent of the catalyst. The support materials used in this invention include those which are often referred to as being in catalytically-active form, but any such activity is generally of a lower order compared with that of the catalytically-active, promoting platinum group metal and base metal components. The particle sizes of the major portion of the alumina support are often less than about 40 mesh, preferably less than about 325 mesh, when combined with the solid, catalytically-promoting base metal component. The sizes of the major portion of the alumina support particles when so combined may often be above about 20 microns.

In making the catalysts of this invention it is preferred that the alumina support component and solid, base metal component be comminuted together to provide a mixture in which the major portion of the solid particles may advantageously be of a size of up to about 10 or 15 microns. This operation can be conducted in the presence of a liquid, e.g., an aqueous liquid, and sufficient of the liquid may be present for it to be a continuous phase in the mixture, i.e., the mixture is a slurry. It is preferred that the mixture which is subjected to comminution contain one or more platinum group metals or their compounds, and thus the platinum group metal component can be combined with one or both of the alumina support component and the base metal component prior to undergoing comminution. Alternatively, or in addition, the platinum group metal component could be charged directly into the comminution device.

The comminution can be accomplished in a ball mill or other suitable equipment, and the solids content of the slurry may be, for instance, about 20 to 60 weight percent, preferably about 40 to 55 weight percent. The pH of the slurry is preferably below about 5, and acidity may be supplied by the use of a minor amount of a water-soluble organic or inorganic acid or other water-soluble acidic compounds such as salts. Thus the acid employed may be hydrochloric or nitric acid, or more preferably a lower fatty acid such as acetic acid, which may be substituted with, for example, chlorine as in the case of trichloro-acetic acid. The use of fatty acids may serve to minimize any loss of platinum group metal from the support and minimize reaction of the base metal component with the support. The comminuted mixture is deposited on a macrosize carrier in making the catalysts of this invention.

In order to deposit the solid, catalytically-promoting, base metal and alumina support components on the macrosized carrier, the latter can be contacted with a slurry of the solids which may, and preferably does, contain one or more platinum group metal components. Thus the carrier may be immersed one or more times in an aqueous slurry, with intermediate drying if desired, until the appropriate amount of solids is placed on the carrier. The slurries employed in depositing the catalytically-promoting, base metal and alumina support components on the carrier will often contain about 20 to 60 weight percent of finely-divided solids, preferably about 35 to 55 weight percent.

In the catalysts of this invention the platinum group metal component-base metal component-alumina support composite is provided on the carrier in a minor amount, for example, the composite may comprise about 0.2 to 35 weight percent of the dry, coated carrier, and is preferably about 3 to 25 weight percent. The composite on the carrier is generally formed as a coating over most, if not all, of the surfaces of the carrier. The combined structure may be dried, and, if desired, calcined, preferably at temperatures of at least about 250° C., but not so high as to unduly destroy the surface area of the alumina support, unless such is desired in a given situation.

The macrosize carrier of the catalyst is generally a major amount of the combined catalyst structure, for instance about 65 to 99.8 weight percent, preferably about 75 to 97 weight percent, on a dry basis. The carrier is macrosize, i.e., at least one of its dimensions is at least about 1 millimeter, preferably at least about 2 millimeters, and the carrier may be in pellet form, but the monolithic carriers are preferred. When of the monolithic type the carrier generally has a low total surface area of less than about 10 or 20, preferably less than about 1, square meters per gram as determined by the BET method. These low surface area carriers may be essentially catalytically inert with respect to the reaction system in which the catalyst is employed. The pellet or smaller particle form carriers may be of the low surface area type, i.e., have surface areas similar to those stated for the monolithic carriers, but the pellet carriers may have higher surface areas, e.g. up to about 350 or more, preferably up to about 150 or 200, square meters per gram. The pellet carrier may, for example, have a surface area of at least about 50 square meters per gram, and preferably no dimension of the pellets is larger than about 0.25 or 0.5 inch. Typically, all dimensions of the pellets are about 1/32 to ¼ inch.

The monolithic carriers are of the type that have a plurality of passages through a single piece of the carrier and have a relatively high geometric surface area. The passages are open to fluid flow and are not blocked or sealed against flow from an inlet to a separate outlet, and thus the passages are quite large compared with the size of any surface pores, and the fluids going through the passages are not subject to excessive pressure drop. Preferably, the passages are essentially straight from their fluid inlet to their fluid outlet. Generally, the principal cross-sectional dimension of the passages is at least about 0.1 millimeter. The monolithic catalyst carriers have a unitary, skeletal structure of macrosize with a minimum cross-sectional dimension of at least about 2 centimeters, e.g., in honeycomb form.

The flow passages of the monolithic carrier are usually thin-walled channels providing a relatively large amount of geometric surface area. The channels can be one or more of a variety of cross-sectional shapes and sizes. Thus the channels can be of the cross-sectional shape of, for example, a trapezoid, rectangle, square, sinusoid, hexagon, oval, circle or other shape, so that cross-sections of the support may represent a repeating pattern that can be described as a honeycomb, corrugated or lattice structure. The walls of the cellular channels are generally of a thickness necessary to provide a strong unitary body, and the thickness will often fall in the range of about 0.5 to 25 mils. Metallic structures may often have a thickness of about 0.5 to 5 mils, while ceramic structures generally have a thickness of about 2 to 25 mils. In the case of the latter wall thicknesses, the structures may contain from about 100 to 1000 or more gas inlet openings for the flow channels per square inch of cross-section and a corresponding number of the gas flow channels, preferably about 150 to 500 gas inlets and flow channels per square inch. The open area of the cross-section may be in excess of about 60% of the total area. The size and dimensions of the carrier of the catalysts of this invention can be varied and the length of the flow channels is often at least about 0.5 inch.

The carrier may be ceramic in nature and include, for example cordierite, cordierite-alpha-alumina, silicon nitride, zircon mullite, spodumene, alumina-silica-magnesia, zirconium silicate, sillimanite, magnesium silicates, zircon, petalite, alpha-alumina and aluminosilicates. Although the support may be a glass ceramic, it is preferably unglazed and may be essentially entirely crystalline in form. Further, the carrier structure may have considerable accessible porosity as distinguished from the substantially non-porous porcelain utilized for electrical applications, for instance in spark plugs, characterized by having relatively little accessible porosity.

Thus the carrier structure may have a water pore volume of at least about 10 weight percent, i.e., the support will absorb this amount of water when immersed at ambient conditions and the unabsorbed water removed. Such supports are described, for example, in U.S. Pat. No. 3,565,830, herein incorporated by reference.

The carrier of the catalysts made by this invention may be metallic in nature and be composed of one or more metals or metal alloys. The metallic carriers may be in various shapes such as pellets, grids, wires or in the above-described monolithic form. Preferred metallic supports can be made of the heat-resistant, base-metal alloys, especially those in which iron is a substantial or major component. Such alloys may contain one or more of nickel, chromium and aluminum, and the total of these metals may advantageously comprise at least about 15 weight percent of the alloy, for instance, about 10 to 25 weight percent of chromium, about 3 to 8 weight percent of aluminum and up to about 20 weight percent of nickel, say at least about 1 weight percent of nickel, if any or more than a trace amount be present. The preferred alloys may contain small or trace amounts of one or more other metals such as manganese, copper, vanadium, titanium and the like. The surfaces of the metal carriers may be oxidized at quite elevated temperatures, e.g., at least about 1000° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

The catalytic compositions made by the present invention can be employed to promote chemical reactions, such as reductions, methanations, steam reforming of hydrocarbons and the oxidation of carbonaceous materials, e.g., carbon monoxide, hydrocarbons, oxygen and hydrogen-containing organic compounds, and the like to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen or of nitrogen oxides.

Although some oxidation or reduction may occur at relatively low temperatures, these reactions are often conducted at elevated temperatures of, for instance, at least about 150° C., preferably about 200° to 900° C., and generally with the feedstock in the vapor phase. The materials which are subject to oxidation generally may contain carbon, and may, therefore, be termed carbonaceous. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts made by the present invention are useful in promoting the oxidation or reduction of materials in such effluents. The exhaust gases from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subject to oxidation. Many such reaction systems are known in the art.

The catalysts made by this invention which contain one or both of platinum and palladium, especially platinum, and one or more of rhodium, ruthenium and iridium, especially rhodium, and a base metal containing one or more metals having atomic numbers of 25 to 28 and rhenium, are particularly useful in systems in which it is desired to conduct both oxidation and reduction simultaneously, for instance, to reduce nitrogen oxides while oxidizing carbon monoxide and hydrocarbons which may be present in the reaction system. In such catalysts the non-platinum group metal component may especially be nickel oxide, combinations of nickel oxide with a minor amount of cobalt oxide or manganese oxide based on the total amount of these oxides present, combinations of cobalt and manganese oxides, and the like. The amounts of platinum group metal and the base metal present in such catalysts may be as indicated above. These simultaneous oxidation and reduction systems may be operated at temperatures of about 400° to 800° C., usually at about 450° to 700° C.

When the catalysts of this invention are used to reduce nitrogen oxides and at the same time oxidize hydrocarbons and carbon monoxide in engine exhaust gases, such operations can be conducted with the mixture undergoing treatment having an air to fuel ratio approximating the stoichiometric ratio, i.e., corresponding to approximately 14.65 (wt. basis) for the combustion of a hydrocarbon fuel with an average formula $CH_{1.88}$. Fuels with different carbon/hydrogen ratios may require slightly different air-fuel ratios to produce a stoichiometric mixture. To avoid confusion in making comparisons, the Greek symbol λ has been used at times to present the relationship of a particular air-fuel ratio of a mixture to the stoichiometric ratio. The air-fuel ratio is divided by the stoichiometric ratio so that in this system $\lambda = 1$ is a stoichiometric mixture, $\lambda > 1$ is a fuel-lean mixture, and $\lambda < 1$ is a fuel-rich mixture. For example, at an air-fuel ($CH_{1.88}$) ratio of 14.5, $\lambda = 14.5/14.65 = 0.9898$.

When using fresh catalysts of the present invention, often about 90-100 volume % of the contaminants, i.e., hydrocarbons, carbon monoxide and nitrogen oxides, may be converted to carbon dioxide, water and nitrogen by the polyfunctional catalysts containing platinum or palladium, rhodium, ruthenium or iridium, and base metal having an atomic number of 25 to 28 rhenium, when the system is operated at or near the stoichiometric air-fuel ratio. If a fuel-rich condition is used, the reduction of nitrogen oxides is favored, and if a fuel-lean condition is used, the oxidation of carbon monoxide and hydrocarbons is favored. Although these catalysts could be operated to remove primarily only one type of contaminant, it is a feature of the catalysts that they can convert all three contaminants to harmless compounds without producing hydrogen sulfide, sulfur trioxide or sulfuric acid to a significant, if any, extent from the sulfur in the fuel used in operating engines which are the source of the gases treated. This result can be obtained when the system is operated in a narrow range of air-fuel ratios or "window", close to the stoichiometric air-fuel ratio. Thus the contaminants can be substantially removed if the air-fuel ratio in the material treated by contact with the catalyst is about 14.2 to 14.9, preferably about 14.4 to 14.7, on an average basis and depending to a large extent on such factors as fuel composition. It is feasible to control the variations in air-fuel ratio accordingly. For example, the fuel supply system can be controlled by an oxygen sensor located in the engine exhaust gas at a position before the catalytic converter is reached. The normal variations of such a control system provide a continuous swinging of air-fuel ratio about the desired value, near the stoichiometric amount. The variations are small, however, and the average air-fuel ratio generally remains in the operating window, except for short periods of operation which may occur. Should a more significant excursion outside the operating window occur, the fresh catalysts will generally be capable of substantially completely converting whichever of the contaminants the conditions favor, that is, either nitrogen oxides when the air-fuel ratio is fuel-rich, or the carbon monoxide and hydrocarbons when the air-fuel ratio is fuel-lean. Another benefit of operating a polyfunctional catalyst of the invention with the air-fuel ratio controlled close to the stoichiometric value is that little, if any, sulfur trioxide or sulfuric acid is produced by oxidation of sulfur dioxide present in the exhaust gases, and little, if any, hydrogen sulfide is produced by reduction of the sulfur dioxide. A vehicle so equipped can be expected to meet government standards for sulfate emissions should such be established.

As the polyfunctional catalysts of the invention are used their capacity or activity for promoting a given reaction may decrease to some extent. It is preferred that such activity remain sufficient to convert at least about 60 or 70 volume % of the nitrogen oxide, hydrocarbon and carbon monoxide contaminants in exhaust gases to carbon dioxide, nitrogen and water. Since the amount of a given contaminant in the gases discharged to the atmosphere is the primary concern, acceptable performance may be obtained with catalysts of lesser activity when the feed gases are suitably low in the given contaminant. For example, in order to meet exhaust emission standards, the catalysts should retain over an acceptable period of operation, e.g., at least about 25,000 to 50,000 vehicle miles, substantial and sufficient activity to provide internal combustion engine exhaust gases whose components do not exceed about 3.4 grams/mile CO, about 0.41 gram/mile hydrocarbons, and about 2, or even 1, grams/mile nitrogen oxides when the gases subjected to treatment contain a significantly greater amount of a given component.

Embodiments of the present invention are illustrated by the following examples.

EXAMPLE 1

A platinum-containing, ceria-alumina composite is prepared by mixing 10 kilograms of calcined 10% $CeO_2$-90% $Al_2O_3$ powder in a blender with 2 liters of a platinum-containing aqueous solution. The ceria-alumina powder has a total surface area of about 115 $m^2$/gm., and the platinum-containing solution is made by diluting to 2 liters, 1137.6 grams of an aqueous platinum amine hydroxide solution containing 16% platinum. The platinum-containing solution is sprayed into the blender, and 100 ml. of water is added as a rinse through the equipment used to charge the platinum-containing solution. One liter of an aqueous rhodium nitrate solution is sprayed into the resulting composite in the blender, and this solution is made by diluting to 1 liter, 63.3 grams of an aqueous rhodium nitrate solution containing 9.67 grams of rhodium. 246 milliliters of glacial acetic acid diluted to 400 ml. are then added to the blender, and 100 ml. of water is added as an equipment rinse. The resulting powder contains approximately 75% solids and 25% volatiles which are essentially completely absorbed in the solids. The solids weigh 11,035 grams, and typically at least 90% of the particles are less than 40 microns in size, and the major portion of the particles have sizes above 15 microns.

A portion (1194 g.) of the foregoing described powder is ball-milled for 16 hours with 104.4 grams of nickel oxide powder, 707 ml. of water, 55 ml. of glacial acetic acid and 3 ml. of 1-octanol as a foam suppressant. The ball milling reduces the particle size of the mixture so that typically at least 90% is less than 10 microns in size.

A monolithic support of cordierite containing about 300 flow passages per square inch of cross-section is dipped into the ball-milled mixture which is diluted with water to be more suitable for coating the monolithic substrate. Excess slurry is blown off the support by compressed air, and the support piece is dried for one hour at 150° C. to remove free water and calcined for one hour at 500° C. to yield a finished polyfunctional catalyst (6101-1) containing 1.66 gm/in$^3$ of the ball-milled solids.

EXAMPLE 2

Another portion (1194 gm) of the platinum and rhodium-containing powder described in the first paragraph of Example 1, is ball-milled for 18 hours with 104.4 grams of dry-milled, nickel oxide powder, 707 ml. of water, 55 ml. of glacial acetic acid and 3 ml. of 1-octanol as a foam suppressant. The ball milling reduces the particle size of the mixture so that 90% is less than 10 microns in size. A monolithic support of cordierite containing about 300 flow passages per square inch of cross-section is dipped into the ball-milled mixture which is diluted to a more suitable consistency. Excess slurry is blown off the support by compressed air, and the support piece is dried at 150° C. to remove free water and calcined at 500° C. to yield a finished polyfunctional catalyst (6103-1) containing 1.72 gm/in$^3$ of the ball-milled solids.

EXAMPLE 3

A platinum-containing, ceria-alumia composite is prepared by mixing 210 grams of calcined 5% CeO$_2$-95% Al$_2$O$_3$ powder (surface area about 110 m$^2$) with 120 ccs. of a platinum-containing aqueous solution made by adding sufficient water to 39.62 grams of an aqueous platinum amine hydroxide solution containing 8.33% platinum, to give 120 ccs. The resulting composite is combined with the total aqueous rhodium nitrate solution made by diluting 0.959 grams of a rhodium nitrate solution (18.14% Rh) with water to 40 ccs. 25 cubic centimeters of glacial acetic acid is added to the mixture in which essentially all of the liquids are absorbed by the solids. The resulting powder has 90% in particle sizes of less than 40 microns.

The powder is ball-milled for 19 hours with 24 grams of nickel oxide powder and 63 cc. of water. The ball milling reduces the particle size of the mixture so that 90% is less than 10 microns in size. The ball-milled mixture is diluted with water to give a slurry suitable for coating a monolithic substrate. A monolithic support of cordierite containing about 300 flow passages per square inch of cross-section is dipped into the diluted, ball-milled mixture. Excess slurry is blown off the support by compressed air, and the support piece is dried to remove free water and calcined at 500° C. for 2 hours to yield a polyfunctional catalyst (23 ssp) containing 2.0 gm/in$^3$ of the ball-milled solids.

EXAMPLE 4

A platinum-containing, ceria-alumina composite is prepared by mixing 210 grams of calcined 5% CeO$_2$-95% AL$_2$O$_3$ powder (surface area about 110 m$^2$/gm) with 59.69 grams of an aqueous platinum amine hydroxide solution containing 6.45% platinum. All of the solution is absorbed by the solids. The resulting composite is combined with 2.32 grams of an aqueous rhodium nitrate solution containing 8.44% rhodium and all of the solution is absorbed by the composite. A mixture made by combining 44 ccs. of glacial acetic acid with 43.96 grams of nickel carbonate is added to the platinum and rhodium-containing solids. The resulting powder has 90% in particle sizes less than 40 microns. The powder is ball-milled for 19 hours. The particle size of the mixture is reduced so that 90% is less than 10 microns in size. The ball-milled mixture is diluted with water to give a slurry which is more suitable for coating a monolithic substrate. A monolithic support of cordierite containing about 300 flow passages per square inch of cross-section is dipped into the diluted, ball-milled mixture. Excess slurry is blown off the support by compressed air, and the support piece is dried to remove free water and calcined at 500° C. for 2 hours to yield a polyfunctional catalyst (1 ssp) containing 1.74 gm/in$^3$ of the ball-milled solids.

EXAMPLE 5

A platinum-containing, ceria-alumina composite is prepared by mixing 0.5 kilogram of calcined 5% CeO$_2$-95% Al$_2$O$_3$ powder (surface area of about 115 m$^2$/gm) with a platinum-containing aqueous solution. The platinum-containing solution contains 9.009 gms. of platinum as platinum amine hydroxide and is diluted to 400 ccs. by the addition of deionized water. The resulting composite is mixed with an aqueous rhodium nitrate solution made by diluting to 50 ccs., 2.6141 grams of rhodium nitrate solution containing about 18.14% rhodium. 45 cubic centimeters of glacial acetic acid are then added to the composite, and all of the liquids is absorbed by the solids. At least 90% of the resulting powder is less than 40 microns in size.

The foregoing described powder is ball-milled for 17 hours with 66.7 grams of nickel oxide powder and 150 ml. of water. The ball milling reduces the particle size of the mixture so that 90% is less than 10 microns in size.

The ball-milled mixture is diluted with water to be more suitable for coating a monolithic substrate. A monolithic support of cordierite containing about 300 flow passages per square inch of cross-section is dipped into the diluted, ball-milled mixture. Excess slurry is blown off the support by compressed air, and the support piece is dried at 120° C. to remove free water and calcined at 500° C. for 0.25 hours to yield a polyfunctional catalyst (30 ssp) containing 1.76 gm/in$^3$ of the ball-milled solids.

EXAMPLE 6

A platinum-containing, ceria-alumina composite is prepared by mixing 2 kilograms of calcined 5% CeO$_2$-

95% Al$_2$O$_3$ powder (surface area of about 115 m$^2$/gm) with a platinum-containing aqueous solution. The solution is made by diluting to 1500 ccs., 438.0 ccs. of an aqueous platinum amine hydroxide solution containing 64.1 gms. of platinum. The resulting composite is mixed with an aqueous rhodium nitrate solution made by dilution to 100 ccs., 15.5 grams of an aqueous rhodium nitrate solution containing 2.81 grams of rhodium. 140 cubic centimeters of glacial acetic acid are then added to the composite, and all of the liquids is absorbed by the solids. The resulting powder weighs about 3740 grams, and 90% is less than 40 microns in size.

A portion (935 gms) of the foregoing described powder is ball-milled for 16 hours with 29.9 gms. of nickel oxide powder, 29.9 gms. of zinc oxide and 250 ccs. of water. 25 cubic centimeters of glacial acetic acid and 50 ccs. of deionized water are added and milling is continued for 1 hour. About 50 ml. of wash water was added. The ball milling reduced the particle size of the mixture so that 90% is less than 10 microns in size. A monolithic support of cordierite containing about 300 flow passages per square inch of cross-section is dipped into the ball-milled mixture. Excess slurry is blown off the support by compressed air, and the support piece is dried at 110° C. overnight to remove free water and calcined at 500° C. for 15 minutes to yield a polyfunctional catalyst (1B SSP) containing about 1.80 gm/in$^3$ of the ball-milled solids.

EXAMPLE 7

Another portion (935 grams) of the platinum and rhodium-containing powder which is produced as described in Example 6 is ball-milled overnight with 59.8 grams of cobalt oxide and 250 ccs of water. 50 milliliters of water are added and milling is continued for 20 minutes. 550 milliliters of the contents of the mill are then removed and 15 ml. of glacial acetic acid and 10 ml. of deionized water are added to the mill. Milling is continued for 15 minutes. The ball milling reduces the particle size of the mixture so that 90% is less than 10 microns in size. A monolithic support of cordierite containing about 300 flow passages per square inch of cross-section is dipped into the ball-milled mixture. Excess slurry is blown off the support by compressed air, and the support piece is dried at 110° C. to remove free water and calcined at 500° C. for about one hour to yield a polyfunctional catalyst (1D ssp) containing 1.73 gm/in$^3$ of the ball-milled solids.

EXAMPLE 8

A platinum and palladium-containing, ceria-alumina composite is prepared by mixing 1 kilogram of calcined 5% CeO$_2$-95% Al$_2$O$_3$ powder (surface area of about 115 m$^2$/gm) with 800 ccs. of a platinum and palladium-containing solution which is thereby completely absorbed by the solids. The solution is made by diluting to 800 ccs., a combination of 28.4 ccs. of a chloroplatinic acid solution (5.68 gms. Pt) and 283.6 ccs. of a palladium chloride solution (2.836 gms. Pd). 30 cubic centimeters of a hydrazine hydrate solution are then added and completely absorbed by the solids. The latter solution is made by diluting 5 ccs. of an 85% hydrazine hydrate solution with water to a volume of 30 ccs. The mixture is then ball-milled with the addition of 50 ccs. of glacial acetic acid, 100 ccs. of water and 118.7 gms. of nickel oxide. After a short milling period, 100 ccs. of water are added and milling is continued overnight. Over 90% of the solids of the slurry has a particle size of less than 10 microns. A monolithic support of cordierite containing about 300 flow passages per square inch of cross-section is dipped into the ball-milled mixture. Excess slurry is blown off the support by compressed air, and the support piece is dried at 110° C. to remove free water and calcined in air at 500° C. for about ¼ hour to yield a polyfunctional catalyst (15 ssp) containing about 2 gm/in$^3$ of the ball-milled solids.

EXAMPLE 9

A platinum-containing, ceria-alumina composite is prepared by mixing 5102 grams of calcined 5% CeO$_2$-95% Al$_2$O$_3$ powder (includes 102 gms. of H$_2$O) in a blender with 2 liters of a platinum-containing aqueous solution. The ceria-alumina powder has a total surface area of about 115 m$^2$/gm, and the platinum-containing solution is made by diluting to 1198 mls., 399.7 grams of an aqueous platinum amine hydroxide solution containing 15.17% platinum. The platinum-containing solution is sprayed into the blender followed by a 50 ml. water equipment rinse. 600 milliliters of an aqueous rhodium nitrate solution is sprayed into the resulting composite in the blender, and this solution is made by the dilution to 600 milliliters of 42.2 grams of an aqueous rhodium nitrate solution containing 13.05% of rhodium. 117 milliliters of glacial acetic acid diluted to 300 ml. are then added to the blender, and 50 ml. of water is added after the acetic acid as an equipment rinse. The resulting powder which has essentially completely absorbed the liquids weighs 7257 grams, contains 70.2% solids and 29.8% volatiles, and 90% is less than 40 microns in size.

A portion (1231 gms.) of the foregoing described powder is ballmilled for 16 hours with 136 grams of nickel oxide powder, (76.3% Ni), 638 ml. of water, 55 ml. of glacial acetic acid and 3 ml. of 1-octanol as a foam suppressant. The ball milling reduces the particle size of the mixture so that 90% is less than 12 microns in size.

The ball-milled mixture is diluted with water to be more suitable for application to a monolithic support. A monolithic support of cordierite containing about 300 flow passages per square inch of cross-section is dipped into the diluted, ball-milled mixture. Express slurry is blown off the support by compressed air, and the support piece is dried at 150° C. to remove free water and calcined at 500° C. to yield a polyfunctional catalyst (2521) containing 2.17 gm/in$^3$ of the ball-milled solids.

EXAMPLE 10

Another portion (1231 gms.) of the platinum and rhodium-containing powder whose preparation is described in the first paragraph of Example 9 is ball-milled for 16 hours with 136 grams of sintered nickel oxide powder (76.3%) nickel, 638 ml. of water, 55 ml. of glacial acetic acid and 3 ml. of 1-octanol as a foam suppressant. The ball milling reduces the particle size of the mixture so that 90% is less than 10 microns in size. The resulting slurry has about 47% solids. 187 mls. of water are added to the ball-milled mixture, and a monolithic support of cordierite containing about 300 flow passages per square inch of cross-section is dipped into the diluted, ball-milled mixture. Excess slurry is blown off the support by compressed air, and the support piece is dried at 150° C. to remove free water and calcined at 500° C. to yield a polyfunctional catalyst (2522) containing 2.13 gm/in$^3$ of the ball-milled solids.

EXAMPLE 11

Another portion (1231 gms) of the platinum and rhodium-containing powder whose preparation is described in the first paragraph of Example 9 is ball-milled for 16 hours with 440 grams of nickel acetate powder (23.6% Ni), 638 ml. of water, 55 ml. of glacial acetic acid and 3 ml. of 1-octanol as a foam suppressant. The ball milling reduces the particle size of the mixture so that 90% is less than 10 microns in size. The ball-milled mixture is diluted with water, and a monolithic support of cordierite containing about 300 flow passages per square inch of cross-section is dipped into the diluted, ball-milled mixture. Excess slurry is blown off the support by compressed air. The support piece is dried at 150° C. to remove free water and calcined at 500° C. to yield a polyfunctional catalyst (2524) containing 2.13 gm/in$^3$ of the ball-milled solids.

EXAMPLE 12

Another portion (1231 gms.) of the platinum and rhodium-containing powder whose preparation is described in the first paragraph of Example 9 is ball-milled for 16 hours with 328 grams of nickel formate powder (31.6% Ni), 638 ml. of water, 55 ml. of glacial acetic acid and 3 ml. of 1-octanol as a foam suppressant. The ball milling reduces the particle size of the mixture so that 90% is less than 10 microns in size. 250 mls. of water are added to facilitate removal of the slurry from the ball mill. The ball-milled mixture is diluted with 125 mls. of water, and a monolithic support of cordierite containing about 300 flow passages per squre inch of cross-section is dipped into the diluted, ball-milled mixture. Excess slurry is blown off the support by compressed air, and the support piece is dried at 150° C. to remove free water and calcined at 500° C. to yield a polyfunctional catalyst (2525) containing 2.19 gm/in$^3$ of the ball-milled solids.

EXAMPLE 13

A platinum-containing, ceria-alumina composite is prepared by mixing 4048 grams of calcined 5% CeO$_2$-95% Al$_2$O$_3$ powder (98.8% solids) in a blender with a platinum-containing aqueous solution. The ceria-alumina powder has a total surface area of about 115 m$^2$gm., and the platinum-containing solution is made by diluting to 901 milliliters, 319.7 grams of an aqueous platinum amine hydroxide solution containing 15.17% platinum. The platinum-containing solution is sprayed into the blender, and 34 mls. of water are added as a rinse through the equipment used to charge the platinum-containing solution. 416 milliliters of an aqueous rhodium nitrate solution are sprayed into the resulting composite in the blender, and this solution is made by the dilution to 416 milliliters of 33.1 grams of an aqueous rhodium nitrate solution containing 13.32% rhodium. 94 milliliters of glacial acetic acid diluted to 174 ml. are then added to the blender, and 34 mls. of water are added as an equipment rinse. The resulting powder which has essentially completely absorbed the liquids, contains 76% solids and 24% volatiles, and 90% is less than 40 microns in size.

A portion (1095 gms.) of the foregoing described powder is ball-milled for 16 hours with 168 grams of nickel hydroxide powder, 741 ccs. of water, 56 ccs. of glacial acetic acid and 3 ccs. of 1-octanol as a foam suppressant. The ball milling reduces the particle size of the mixture so that 90% is less than 10 microns in size. 200 milliliters of water are added to the mill to enable removal of the mixture.

The ball-milled mixture is diluted with water, and a monolithic support of cordierite containing about 300 flow passages per square inch of cross-section is dipped into the diluted, ball-milled mixture. Excess slurry is blown off the support by compressed air, and the support piece is dried at 150° C. to remove free water and calcined at 500° C. to yield a polyfunctional catalyst (4828) containing 1.81 gm/in$^3$ of the ball-milled solids.

EXAMPLE 14

A mixture containing 863 grams of calcined 5% CeO$_2$-95% Al$_2$O$_3$ (99% solids) having a total surface area of about 115 m$^2$/gm is ball-milled in a wet mill jar for 16 hours with 147 grams of nickel oxide powder (99% solids), 927 ml. of water, 60 ml. of glacial acetic acid and 3 ml. of 1-octanol as a foam suppressant. The resulting mixture contains approximately 50% solids and 50% volatiles.

A second and similar ball-milling operation is conducted and the two ball-milled mixtures are placed in a 2 gallon bottle, along with 200 ml. of water added as an equipment rinse. Then with good stirring, 86.9 gm. of a H$_2$PtCl$_6$ aqueous solution is added. The platinum-containing solution has 20.7 grams of platinum. 33.7 Grams of an aqueous rhodium chloride solution containing 1.882 grams of rhodium are added to the mixture with stirring. Hydrogen sulfide is passed through the resulting slip for approximately 15 minutes and the composite is thereafter mixed for 45 minutes using an air mixer.

A monolithic carrier of cordierite containing about 300 flow passages per square inch of cross-section is dipped into the ball-milled mixture, which is diluted with water to facilitate coating the monolithic substrate. Excess slurry is blown off the coated carrier by compressed air. The coated carrier is dried at 150° C. to remove free water, and calcined at 500° C. to yield polyfunctional catalyst (2953-5) containing 2.16 gm/in$^3$ of the ball-milled solids.

EXAMPLE 15

A nickel oxide, platinum, rhodium and ceria-alumina-containing composite was made by providing in a ball mill the following: 863 grams of calcined 5% CeO$_2$-95% Al$_2$O$_3$ powder (99% solids), 147 grams of nickel oxide, 60 ml. of glacial acetic acid, 3 ml. of 1-octanol as a foam suppressant, 830 ml. of water, 43.4 gm. H$_2$PtCl$_6$ solution (containing 23.81% platinum), 53.8 gm. of RhCl$_3$ solution (containing 1.75% rhodium). The total composite weighs 2,000 grams of which 1,011 grams is solids.

The foregoing described mixture with an additional 100 ml. of H$_2$O, is ball-milled for 16 hours. The ball milling reduces the particle size of the mixture so that typically at least 90% is less than 10 microns in size.

A monolithic carrier of cordierite containing about 300 flow passages per square inch of cross-section is dipped into the ball-milled mixture, which is diluted with water to facilitate coating the monolithic substrate. Excess slurry is blown off the structure by compressed air, and the coated carrier is dried at 150° C. to yield a finished polyfunctional catalyst (2954-1) containing 2.16 gm/in$^3$ of the ball-milled solids.

EXAMPLE 16

Example 15 is repeated except that hydrogen sulfide is passed into the ball milled mixture for 15 minutes with stirring, after which the mixture is stirred for 45 minutes. The coated, calcined carrier (2955-3) contains 2.12 gm/in$^3$ of the catalytic coating.

EXAMPLE 17

A rhodium and platinum-containing, ceria-alumina composite is prepared by adding to a ball mill, 1010 grams of calcined 5% CeO$_2$-95% Al$_2$O$_3$ powder (99% solids) along with 60 ml. glacial acetic acid, 3 ml. 1-octanol as a foam suppressant, 87.0 grams of an aqueous H$_2$PtCl$_6$ solution containing 23.77% platinum, 33.6 grams of an aqueous rhodium chloride solution containing 1.88 grams of rhodium, and 829 ml. of water. The mixture is milled for 16 hours. The ceria-alumina powder has a total surface area of about 115 m$^2$/gm, and before milling typically at least 90% of the particles are less than 40 microns in size. The major portion of the particles have sizes above 15 microns. The resulting milled mixture is drained into a beaker, weighs 1716 grams, and contains approximately 44.5% solids and 55.5% volatiles. The solids weigh 764 grams, including 17.24 grams of the precious metal. Next 28 ml. of hydrazine was added, with thorough mixing, to the beaker containing the slurry.

A separate nickel oxide containing, ceria-alumina composite is prepared by mixing 715 grams of calcined 5% CeO$_2$-95% Al$_2$O$_3$ powder (99% solids) in a ball mill with 294 grams of nickel oxide (99% solids), 60 ml. of glacial acetic acid and 3 ml. of 1-octanol as a foam suppressant, and 927 ml. of water. The resulting milled slurry is drained into a beaker and weighs 1658 grams of which 46.7% or 774 grams is solids.

The rhodium and platinum-containing composite of 764 grams (solids basis) is thoroughly mixed with 764 grams (solids basis) of the nickel oxide-containing composite diluted with 150 ml. of water. A monolithic carrier of cordierite containing about 300 flow passages per square inch of cross-section is dipped into the ball-milled mixture, which is diluted with water to facilitate coating the monolithic substrate. Excess slurry is blown off the coated carrier by compressed air, and the piece is dried at 150° C. to remove free water and calcined at 500° C. to yield a finished polyfunctional catalyst (8715-7) containing 2.13 gm/in$^3$ of the ball-milled solids.

EXAMPLE 18

Two platinum and rhodium-containing, ceria-alumina composites are prepared by mixing in each of 2 separate jars the following ingredients: 863 grams of calcined 5% CeO$_2$-95% Al$_2$O$_3$ powder (99% solids), 60 ml. glacial acetic acid, 3 ml. 1-octanol as a foam suppressant, 927 ml. of water, 43.5 grams of an aqueous H$_2$PtCl$_6$ solution containing 23.77% platinum and 16.8 grams of an aqueous rhodium chloride containing 5.59% rhodium. Typically, at least 90% of the particles in each jar are less than 40 microns in size, and the major portion of the particles have sizes above 15 microns.

After ball-milling the foregoing described mixtures for 16 hours, the platinum group metals are fixed by adding 18.0 ml. of hydrazine (85% solution) to each mixture. After thorough mixing, 147 grams of nickel oxide (99% solids) is added to each jar and milling is continued for 8 hours. The milled products were then combined.

A monolithic carrier of cordierite containing about 300 flow passages per square inch of cross-section is dipped into the combined ball-milled mixture, which is diluted with water to facilitate coating the monolithic substrate. Excess slurry is blown off the coated carrier by compressed air, and the support piece is dried at 150° C. to yield a finished polyfunctional catalyst (8716-11) containing 2.14 gm/in$^3$ of the ball-milled solids.

EXAMPLE 19

Two composites are prepared, each containing 863 grams of calcined 5% CeO$_2$-95% Al$_2$O$_3$ powder (99% solids) having a total surface area of about 115 m$^2$/gm., 147 grams of nickel oxide powder (99% solids), 927 ml. of water, 60 ml. of glacial acetic acid and 3 ml. of 1-octanol as a foam suppressant. Each of the resulting mixtures contains typically at least 90 percent of the particles are less than 40 microns in size. Each of the mixtures is ball-milled for 16 hours and the particles are reduced in size, and at least about 90% are less than 10 microns in size.

A platinum-containing aqueous solution is then mixed with a portion of the ball-milled composite (883 gm. of solids). The platinum-containing solution is 77 gm. of an aqueous solution of H$_2$PtCl$_6$ containing 23.77% platinum. Hydrazine (29.3 ml.) is then bubbled through the solution with continuous stirring for about one hour with the addition of 100 ml. of H$_2$O.

To a second portion of the ball-milled composite, containing 883 grams solids, is added 29.67 grams of an aqueous rhodium chloride solution containing 1.66 grams rhodium. After mixing for five minutes 2.7 ml. of hydrazine is added. The composite is stirred for one hour and the rhodium-containing second composite is mixed with the platinum-containing first composite for 10 minutes.

A monolithic carrier of cordierite containing about 300 flow passages per square inch of cross-section is dipped into the platinum group metals-containing mixture, which is diluted with water to facilitate coating the monolithic substrate. Excess slurry is blown off the coated carrier by compressed air, and the piece is dried at 150° C. to remove free water and calcined at 500° C. to yield a finished polyfunctional catalyst (8717-16) containing 2.13 gm/in$^3$ of the ball-milled, platinum and rhodium-containing solids.

EXAMPLE 20

A platinum-containing, ceria-alumina composite is prepared by mixing 0.5 kilogram of calcined 5% CeO$_2$-95% Al$_2$O$_3$ powder (surface area of about 115 m$^2$/gm) with a platinum-containing aqueous solution. The platinum-containing solution is made by mixing 42.1 gms. of platinum amine hydroxide solution containing 6.4 grams of platinum and diluting the mixture to 350 ccs. by the addition of deionized water. The resulting composite is mixed and combined with an aqueous rhodium nitrate solution made by diluting to 60 ccs., 3.2421 grams of rhodium nitrate solution containing about 18.14% rhodium. 35 cubic centimeters of glacial acetic acid are then added to the composite, and all of the liquids is absorbed by the solids. At least 90% of the resulting powder is less than 40 microns in size. The powder is ball-milled for 24 hours with 73.0 grams of nickel oxide powder and 150 ml. of water. The ball milling reduces the particle size of the mixture so that 90% is less than 10 microns in size.

The ball-milled mixture is diluted with water to be more suitable for coating a monolithic substrate. A degreased metal monolithic support containing about 400 flow passages per square inch of cross-section is dipped into the diluted, ball-milled mixture. Excess slurry is blown off the support by compressed air, and the support piece is dried at 110° C. for 16 hours to remove free water and calcined at 500° C. for 1 hour to yield a polyfunctional catalyst (38 ssp) containing 2.067 gm/in$^3$ of the ball-milled solids.

Catalysts of the above examples are tested for oxidation and reduction activity using a synthetic automobile engine exhaust gas containing, for example, 1.65% carbon monoxide, 13.5% carbon dioxide, 13.5% water, 0.9% oxygen, 0.55% hydrogen, 300 ppm hydrocarbons, 2000 ppm NO and the balance nitrogen (these amounts are all expressed on a volume basis). The synthetic exhaust gas is passed in contact with the catalyst at a series of air-to-fuel ratios (A/F), typically at 100,000 VHSV and inlet temperatures of about 500° C. and 650° C. All results in the table below show the performance of the catalysts after each has been used for a short period to purify the synthetic exhaust gases from an air-fuel ratio-controlled engine. Where more than one run is conducted using a particular catalyst, results of the latest run only is reported since it is believed that these results are obtained under conditions which are more precisely monitored and controlled. The latter results are, therefore considered to be a more accurate reflection of the performance of the particular catalysts. The conversions for carbon monoxide, NO and hydrocarbons, as well as the percent ammonia produced from NO, are set forth in the following table:

TABLE 1

| Example Number | Catalyst Number | Run Number | Inlet Temp.,°C. | A/F | NO | Percent Conversion CO | HC | Percent NH$_3$ From NO |
|---|---|---|---|---|---|---|---|---|
| 1 | 6101-1 | 657 | 500 | 14.2 | 92 | 61 | 40 | 58 |
|   |   |   |   | 14.5 | 96 | 98 | 74 | 11 |
|   |   |   |   | 14.6 | 16 | 99 | 100 |   |
|   |   |   |   | 14.7 | 6 | 99 | 99 |   |
|   |   |   |   | 14.9 | 0 | 99 | 98 |   |
| 1 | 6101-1 | 659 | 650 | 14.2 | 97 | 70 | 81 | 11 |
|   |   |   |   | 14.5 | 96 | 95 | 91 | 2 |
|   |   |   |   | 14.6 | 16 | 98 | 100 |   |
|   |   |   |   | 14.7 | 3 | 98 | 100 |   |
|   |   |   |   | 14.9 | 0 | 98 | 100 |   |
| 2 | 6103-1 | 595 | 500 | 14.2 | 97 | 88 | 100 | 21 |
|   |   |   |   | 14.5 | 87 | 99 | 100 | 0 |
|   |   |   |   | 14.6 | 42 | 99 | 100 |   |
|   |   |   |   | 14.7 | 14 | 99 | 100 |   |
|   |   |   |   | 14.9 | 3 | 99 | 100 |   |
| 2 | 6103-1 | 597 | 650 | 14.2 | 95 | 75 | 100 | 2 |
|   |   |   |   | 14.5 | 96 | 96 | 100 | 0 |
|   |   |   |   | 14.6 | 55 | 99 | 100 |   |
|   |   |   |   | 14.7 | 19 | 99 | 100 |   |
|   |   |   |   | 14.9 | 0 | 99 | 100 |   |
| 3 | 23SSP | 183 | 500 | 14.2 | 99 | 81 | 100 | 100 |
|   |   |   |   | 14.5 | 100 | 95 | 100 | 9 |
|   |   |   |   | 14.6 | 75 | 99 | 100 |   |
|   |   |   |   | 14.7 | 44 | 99 | 100 |   |
|   |   |   |   | 14.9 | 14 | 99 | 100 |   |
| 3 | 23SSP | 185 | 650 | 14.2 | 99 | 75 | 100 | 61 |
|   |   |   |   | 14.5 | 99 | 94 | 100 | 8 |
|   |   |   |   | 14.6 | 76 | 100 | 100 |   |
|   |   |   |   | 14.7 | 23 | 100 | 100 |   |
|   |   |   |   | 14.9 | 0 | 100 | 99 |   |
| 4 | ISSP | 812 | 500 | 14.2 | 99 | 87 | 100 | 100 |
|   |   |   |   | 14.5 | 99 | 97 | 100 | 3 |
|   |   |   |   | 14.6 | 59 | 97 | 100 |   |
|   |   |   |   | 14.7 | 33 | 99 | 100 |   |
|   |   |   |   | 14.9 | 2 | 99 | 99 |   |
| 4 | ISSP | 814 | 650 | 14.2 | 99 | 81 | 100 | 56 |
|   |   |   |   | 14.5 | 99 | 95 | 100 | 3 |
|   |   |   |   | 14.6 | 41 | 99 | 100 |   |
|   |   |   |   | 14.7 | 8 | 99 | 100 |   |
|   |   |   |   | 14.9 | 0 | 99 | 99 |   |
| 5 | 30SSP | 660 | 500 | 14.2 | 92 | 55 | 47 | 65 |
|   |   |   |   | 14.5 | 97 | 93 | 69 | 32 |
|   |   |   |   | 14.6 | 39 | 98 | 100 |   |
|   |   |   |   | 14.7 | 10 | 98 | 99 |   |
|   |   |   |   | 14.9 | 0 | 98 | 99 |   |
| 5 | 30SSP | 662 | 650 | 14.2 | 97 | 69 | 86 | 5 |
|   |   |   |   | 14.5 | 96 | 95 | 93 | 0 |
|   |   |   |   | 14.6 | 49 | 98 | 100 |   |
|   |   |   |   | 14.7 | 7 | 98 | 100 |   |
|   |   |   |   | 14.9 | 0 | 98 | 100 |   |
| 6 | 1BSSP | 199 | 500 | 14.2 | 99 | 58 | 84 | 100 |
|   |   |   |   | 14.5 | 99 | 87 | 94 | 37 |
|   |   |   |   | 14.6 | 99 | 94 | 94 |   |
|   |   |   |   | 14.7 | 74 | 99 | 94 |   |
|   |   |   |   | 14.9 | 15 | 99 | 69 |   |
| 6 | 1BSSP | 201 | 650 | 14.2 | 99 | 58 | 96 | 80 |
|   |   |   |   | 14.5 | 99 | 83 | 81 | 6 |
|   |   |   |   | 14.6 | 99 | 95 | 76 |   |
|   |   |   |   | 14.7 | 25 | 99 | 89 |   |
|   |   |   |   | 14.9 | 0 | 99 | 99 |   |
| 7 | 1DSSP | 993 | 500 | 14.2 | 100 | 81 | 100 | 66 |

TABLE 1-continued

| Example Number | Catalyst Number | Run Number | Inlet Temp.,°C. | A/F | NO | Percent Conversion CO | HC | Percent NH₃ From NO |
|---|---|---|---|---|---|---|---|---|
| | | | | 14.5 | 100 | 95 | 100 | 8 |
| | | | | 14.6 | 75 | 100 | 95 | |
| | | | | 14.7 | 39 | 100 | 95 | |
| | | | | 14.9 | 13 | 100 | 93 | |
| 7 | 1DSSP | 995 | 650 | 14.2 | 97 | 75 | 100 | 43 |
| | | | | 14.5 | 97 | 93 | 100 | 1 |
| | | | | 14.6 | 77 | 100 | 100 | |
| | | | | 14.7 | 12 | 100 | 100 | |
| | | | | 14.9 | 0 | 100 | 99 | |
| 8 | 1SSSP | 993 | 500 | 13.4 | 99 | 50 | 63 | 61 |
| | | | | 14.6 | 96 | 77 | 78 | 11 |
| | | | | 14.8 | 96 | 93 | 89 | 6 |
| | | | | 15.0 | 23 | 96 | 74 | |
| | | | | 15.3 | 5 | 96 | 74 | |
| 9 | 2521 | 510 | 500 | 14.2 | 81 | 45 | 4 | 57 |
| | | | | 14.5 | 96 | 95 | 24 | 18 |
| | | | | 14.6 | 85 | 100 | 100 | |
| | | | | 14.7 | 16 | 100 | 100 | |
| | | | | 14.9 | 0 | 100 | 100 | |
| 9 | 2521 | 512 | 650 | 14.2 | 98 | 58 | 34 | 33 |
| | | | | 14.5 | 99 | 91 | 52 | 13 |
| | | | | 14.6 | 97 | 100 | 97 | |
| | | | | 14.7 | 13 | 100 | 100 | |
| | | | | 14.9 | 0 | 100 | 100 | |
| 10 | 2522 | 507 | 500 | 14.2 | 88 | 47 | 9 | 43 |
| | | | | 14.5 | 98 | 92 | 34 | 11 |
| | | | | 14.6 | 99 | 100 | 90 | |
| | | | | 14.7 | 22 | 100 | 100 | |
| | | | | 14.9 | 0 | 100 | 100 | |
| 10 | 2522 | 509 | 650 | 14.2 | 99 | 55 | 41 | 11 |
| | | | | 14.5 | 100 | 91 | 70 | 0 |
| | | | | 14.6 | 99 | 98 | 95 | |
| | | | | 14.7 | 26 | 98 | 99 | |
| | | | | 14.9 | 0 | 98 | 99 | |
| 11 | 2524 | 132 | 500 | 14.2 | 95 | 77 | 74 | 63 |
| | | | | 14.5 | 99 | 92 | 69 | 23 |
| | | | | 14.6 | 99 | 100 | 81 | |
| | | | | 14.7 | 44 | 100 | 100 | |
| | | | | 14.9 | 0 | 100 | 99 | |
| 11 | 2524 | 134 | 650 | 14.2 | 99 | 65 | 65 | 19 |
| | | | | 14.5 | 99 | 90 | 75 | 4 |
| | | | | 14.6 | 99 | 97 | 83 | |
| | | | | 14.7 | 25 | 100 | 99 | |
| | | | | 14.9 | 0 | 100 | 99 | |
| 12 | 2525 | 136 | 500 | 14.2 | 100 | 72 | 72 | 54 |
| | | | | 14.5 | 100 | 91 | 80 | 15 |
| | | | | 14.6 | 100 | 98 | 88 | |
| | | | | 14.7 | 40 | 98 | 99 | |
| | | | | 14.9 | 7 | 98 | 99 | |
| 12 | 2525 | 138 | 650 | 14.2 | 100 | 62 | 70 | 12 |
| | | | | 14.5 | 99 | 90 | 77 | 0 |
| | | | | 14.6 | 99 | 97 | 82 | |
| | | | | 14.7 | 50 | 98 | 99 | |
| | | | | 14.9 | 0 | 98 | 99 | |
| 14 | 2953-5 | 346 | 500 | 14.2 | 84 | 40 | 3 | 47 |
| | | | | 14.5 | 96 | 90 | 18 | 15 |
| | | | | 14.6 | 96 | 98 | 61 | |
| | | | | 14.7 | 38 | 100 | 100 | |
| | | | | 14.9 | 0 | 98 | 100 | |
| 14 | 2953-5 | 348 | 650 | 14.2 | 98 | 55 | 29 | 18 |
| | | | | 14.5 | 99 | 90 | 46 | 5 |
| | | | | 14.6 | 98 | 98 | 85 | |
| | | | | 14.7 | 11 | 100 | 100 | |
| | | | | 14.9 | 0 | 98 | 100 | |
| 15 | 2954-1 | 5347 | 500 | 14.2 | 91 | 44 | 7 | 47 |
| | | | | 14.5 | 97 | 90 | 25 | 15 |
| | | | | 14.6 | 98 | 100 | 95 | |
| | | | | 14.7 | 17 | 100 | 100 | |
| | | | | 14.9 | 4 | 100 | 100 | |
| 15 | 2954-1 | 5349 | 650 | 14.2 | 99 | 62 | 49 | 11 |
| | | | | 14.5 | 99 | 91 | 61 | 2 |
| | | | | 14.6 | 98 | 98 | 94 | |
| | | | | 14.7 | 11 | 100 | 100 | |
| | | | | 14.9 | 0 | 100 | 100 | |
| 16 | 2955 | 351 | 500 | 14.2 | 80 | 44 | 4 | 43 |
| | | | | 14.5 | 96 | 91 | 22 | 15 |
| | | | | 14.6 | 96 | 98 | 80 | |
| | | | | 14.7 | 13 | 98 | 100 | |
| | | | | 14.9 | 0 | 98 | 100 | |

TABLE 1-continued

| Example Number | Catalyst Number | Run Number | Inlet Temp.,°C. | A/F | NO | CO | HC | Percent NH$_3$ From NO |
|---|---|---|---|---|---|---|---|---|
| 16 | 2955 | 353 | 650 | 14.2 | 97 | 67 | 48 | 15 |
|  |  |  |  | 14.5 | 98 | 92 | 60 | 3 |
|  |  |  |  | 14.6 | 94 | 98 | 93 |  |
|  |  |  |  | 14.7 | 11 | 98 | 99 |  |
|  |  |  |  | 14.9 | 0 | 98 | 99 |  |
| 19 | 8717 | 5355 | 500 | 14.2 | 77 | 44 | 2 | 32 |
|  |  |  |  | 14.5 | 99 | 89 | 14 | 8 |
|  |  |  |  | 14.6 | 96 | 98 | 90 |  |
|  |  |  |  | 14.7 | 35 | 98 | 99 |  |
|  |  |  |  | 14.9 | 10 | 98 | 95 |  |
| 19 | 8717 | 357 | 650 | 14.2 | 99 | 55 | 26 | 11 |
|  |  |  |  | 14.5 | 99 | 91 | 43 | 2 |
|  |  |  |  | 14.6 | 99 | 98 | 82 |  |
|  |  |  |  | 14.7 | 17 | 98 | 82 |  |
|  |  |  |  | 14.9 | 0 | 100 | 100 |  |

The foregoing described catalysts, and methods for their manufacture, according to this invention relate to compositions containing one or more catalytically-promoting platinum group metal and base metal components and an alumina support in a catalyst having a particulate macrosize carrier. Other components such as catalytically-promoting metal components, refractory oxide supports, stabilizers and the like, may be added to the catalysts by various procedures, and the advisability of doing so may depend on several considerations, for instance, the cost of manufacture, or the nature, performance characteristics or other properties of the catalyst desired for use in a given situation.

It is claimed:

1. A method of manufacturing a catalyst composition having a catalytically-promoting material on a solid, macrosize carrier, said catalytically promoting material comprising a platinum group metal component containing one or both of platinum and palladium, and a solid, finely-divided base metal component containing one or more base metals having an atomic number from 25 to 28 and rhenium, and a solid, finely-divided alumina support, said base metal component being present in said catalyst composition in an amount greater than said platinum group metal component, the method including the steps of combining said support with one or more compounds of a platinum group metal, including at least one of platinum and palladium, while said compounds are contained in the same or different liquids, heating said alumina support after the aforesaid combining at a temperature sufficiently high to provide thereon said platinum group metal component maintaining at least a major amount of said base metal component in solid form throughout the manufacture of said catalyst composition, depositing said solid, finely-divided base metal component and said solid, finely-divided support on said carrier by forming a slurry or slurries of said support and of said base metal component in a liquid and contacting said carrier with a slurry or slurries of said solids in liquid, said solids being in either the same or different slurries, and drying said support after said contacting of said support with said slurry or slurries.

2. A method of claim 1 in which the platinum group metal comprises catalytic amounts of one or both of platinum and palladium and one or more rhodium, ruthenium and iridium.

3. A method of claim 2 in which platinum comprises the major amount of the platinum group metal.

4. A method of claim 3 in which said platinum group metal comprises platinum and rhodium.

5. A method of claim 4 in which said base metal component comprises nickel, cobalt or manganese oxide, or an oxygen-containing compound which forms said oxide when thermally decomposed.

6. A method of manufacturing a catalyst composition having a catalytically-promoting material on a solid, macrosize carrier which comprises mixing an alumina support and a solid, base metal component, the base metal of which comprises one or more of the metals having an atomic number from 25 to 28 and rhenium, depositing on said solid, macrosize carrier the resulting mixture containing said alumina support and solid, base metal component, both said support and base metal component being in finely-divided form, providing a catalytically-promoting, platinum group metal component as part of said catalytically-promoting material by contacting said support with a liquid containing a compound of a platinum group metal, heating said alumina support after the aforesaid contacting with said liquid at a temperature high enough to provide thereon said platinum group metal component, said platinum group metal comprising one or both of platinum and palladium and said base metal being present in said catalyst composition in an amount greater than said platinum group metal, the method including the step of depositing said solid base metal component and solid support on said carrier by forming a slurry of said support and said base metal component in a liquid and contacting said carrier with a slurry of both of said solids, drying said support after said contacting with said slurry, and maintaining a major amount of said base metal in solid form throughout the manufacture of said catalyst composition.

7. A method of claim 6 in which platinum group metal is part of the mixture containing an alumina support component and one or more base metal components when the mixture is deposited on said macrosize carrier.

8. A method of claim 7 in which said base metal component which is mixed with an alumina support component comprises an oxide or an oxygen-containing compound which forms an oxide when thermally decomposed.

9. A method of claim 6 in which said platinum group metal comprises catalytic amounts of one or both of platinum and palladium and one or more of rhodium, ruthenium and iridium.

10. A method of claim 9 in which said platinum group metal comprises rhodium and a major amount of platinum.

11. A method of claim 10 in which said platinum group metal is part of the mixture containing an alumina support component and base metal component when the mixture is deposited on said macrosize carrier.

12. A method of claim 11 in which said base metal component which is mixed with an alumina support component comprises an oxide or an oxygen-containing compound which forms an oxide when thermally decomposed.

13. A method of claim 6 in which said carrier is monolithic.

14. A method of manufacturing a catalyst composition having a catalytically-promoting material on a monolithic carrier, which comprises mixing a finely-divided, stabilized, activated alumina support a finely-divided, solid, base meal oxide comprising one or more of oxides of nickel, cobalt and manganese, and a platinum group metal component, the latter being so mixed with said support by contacting said support with a compound of platinum and a compound of rhodium, while said compounds are contained in the same or separate liquids, heating said alumina support, after the aforesaid contacting, at a temperature sufficiently high to provide thereon said platinum group metal component with platinum comprising the major amount of said platinum group metals, forming and comminuting an aqueous slurry containing said mixed alumina support said platinum group metal compounds and said base metal oxide, depositing the comminuted slurry on said monolithic carrier by contacting said carrier with said slurry, and drying the deposited slurry to yield said catalyst composition, said base metal oxide being about 0.5 to 10% of said catalyst on a base metal basis and being present in an amount greater than said platinum group metals, and maintaining at least a major amount of said base metal oxide in solid form throughout the manufacture of said catalyst composition.

15. A method of claim 14 in which the stabilized alumina comprises ceria-alumina.

16. A catalyst composition having a catalytically-promoting material comprising a finely-divided alumina support a catalytically-promoting, finely-divided, solid base metal component, the base metals of which are selected from the group consisting of metals having an atomic number from 25 to 28 and rhenium, and a catalytically-promoting platinum group metal component the platinum group metal of which comprises at least one of platinum and palladium, said catalytically-promoting material being deposited on a macrosize, solid carrier, said one or more base metals being present in said catalyst composition in an amount greater than said platinum group metal, said catalyst being prepared by combining said platinum group metal component with said support by contacting said support with one or more compounds of said platinum group metals including at least one of platinum and palladium, while said compounds are contained in one or more liquids, heating said alumina support, after the aforesaid contacting with said liquids, at a temperature sufficiently high to provide said platinum group metal component, depositing said solid, finely-divided base metal component and said solid, finely-divided support on said carrier by forming a slurry or slurries of said base metal component and said support in liquid and contacting said carrier with said slurry or slurries of said solids, liquid, said solids being in either the same or separate slurry or slurries, drying said support after said contacting of said support with said slurry or slurries to provide said catalyst composition, and maintaining at least a major amount of said base metal component in solid form throughout the manufacture of said catalyst composition.

17. A catalyst composition of claim 16 in which the platinum group metal comprises catalytic amounts of one or both of platinum and palladium and one or more of rhodium, ruthenium and iridium.

18. A catalyst composition of claim 17 in which platinum comprises the major amount of the platinum group metal.

19. A catalyst composition of claim 18 in which said platinum group metal comprises platinum and rhodium.

20. A catalyst composition having a catalytically-promoting material comprising a finely-divided, solid alumina support, a catalytically-promoting, finely-divided, solid, base metal component, the base metals of which are selected from the group consisting of metals having an atomic number from 25 to 28 and rhenium, and a catalytically-promoting platinum group metal component, the platinum group metals of which comprise at least one of platinum and palladium, said catalytically-promoting material being deposited on a macrosize, solid carrier, said one or more base metals being present in said catalyst composition in an mount greater than said platinum group metal, said catalyst being prepared by combining said platinum group metal component with said support by contacting said support with one or more compounds of said platinum group metals including at least one of platinum and palladium, while said compounds are contained in one or more liquids, heating said alumina support, after the aforesaid contacting with said one or more liquids, at a temperature sufficiently high to provide thereon said platinum group metal component, and mixing said finely-divided, solid alumina support with said finely-divided solid, base metal component, forming a slurry of said finely-divided solid support and said finely-divided solid base metal component in a liquid and depositing said slurry on said carrier by contacting said carrier with said slurry, drying said support after said contacting of said support with said slurry, and maintaining at least a major amount of said base metal component in solid form throughout the manufacture of said catalyst composition.

21. A catalyst composition of claim 20 in which said base metal component which is mixed with an alumina support component comprises an oxide or an oxygen-containing compound which forms an oxide when thermally decomposed.

22. A catalyst composition of claim 20 in which said platinum group metal comprises catalytic amounts of one or both of platinum and palladium and one or more of rhodium, ruthenium and iridium.

23. A catalyst of claim 22 in which platinum comprises the major amount of the platinum group metal.

24. A catalyst composition of claim 23 in which said platinum group metal comprises rhodium and platinum.

25. A catalyst composition of claim 24 in which base metal component is an oxide and is about 0.5 to 10 weight percent of said catalyst on a base metal basis.

26. A catalyst composition of claim 16 in which said carrier is monolithic.

27. A catalyst composition having a catalytically-promoting material comprising a finely-divided, stabilized, activated alumina support, a catalytically-promoting, finely-divided, solid, base metal oxide comprising one or more oxides of nickel, cobalt and manganese, plus, optionally, one or both of iron and rhenium, and a catalytically-promoting platinum group metal component, the platinum group metal of which comprises at least rhodium and a major amount of platinum, said catalytically-promoting material being deposited on a macrosize, solid, monolithic carrier, said base metal being about 0.5 to 10% of said catalyst composition on a base metal basis and present in an amount greater than said platinum group metal component, said catalyst being prepared by mixing said finely-divided solid alumina support which said finely-divided solid, base metal oxide combining said platinum group metal component with said support by contacting said support with one or more compounds of said platinum group metals including at least one compound of platinum and one of rhodium while said compounds are contained in one or more liquids, heating said alumina support, after the aforesaid contacting with said one or more liquids, at a temperature sufficiently high to provide thereon said platinum group metal component, forming a slurry of said finely-divided solid support and said finely divided solid base metal oxide in an aqueous liquid to provide an aqueous slurry, comminuting said aqueous slurry containing the mixed alumina support and base metal oxide, depositing the comminuted slurry on said monolithic carrier by contacting said carrier with said slurry, drying said support after said contacting of said support with said slurry, and maintaining at least a major amount of said base metal oxide in solid form throughout the manufacture of said catalyst composition.

28. A catalyst composition of claim 27 in which the stabilized alumina comprises ceria-alumina.

29. The method of claim 1 wherein said heating and said drying of said support are carried out after said, support is combined with said compounds of a platinum group metal and the depositing of the resultant combined support and said solid, finely-divided base metal component on said carrier.

30. The method of claim 29 wherein said heating is carried at a temperature of at least about 250° C.

31. The method of claim 6 wherein said heating of said drying of said support are carried out after the aforesaid contacting of said support with said liquid containing said compound and the depositing of the resultant contacted support and said solid, finely-divided base metal component on said carrier.

32. The method of claim 31 wherein said heating is carried out at a temperature of at least about 250° C.

33. The method of claim 14 wherein said heating and said drying of said support are carried out after said support is contacted with said compounds of platinum and rhodium and the depositing of the resultant contacted support and said solid, finely-divided base metal component on said carrier.

34. The method of claim 33 wherein said heating is carried out at a temperature of at least about 250° C.

35. The method of claim 16 wherein said heating and said drying of said support are carried out after the contacting of said support with said compounds in said liquid and the depositing of the resultant contacted support and said solid, finely-divided base metal component on said carrier.

36. The method of claim 35 wherein said heating is carried out at a temperature of at least about 250° C.

37. The method of claim 20 heating and said drying of said support are carried out after said support is contacted with said compounds of a platinum group metal and the depositing of the resultant combined support and said finely-divided, solid base metal component on said carrier.

38. The method of claim 37 wherein said heating is carried out at a temperature of at least about 250° C.

39. The method of claim 27 wherein said heating and said drying of said support are carried out after the contacting of said support with said compounds in said liquid and the depositing of the resultant contacted support and said finely-divided, solid base metal component on said carrier.

40. The method of claim 39 wherein said heating is carried out at a temperature of at least about 250° C.

* * * * *